Patented Apr. 4, 1944

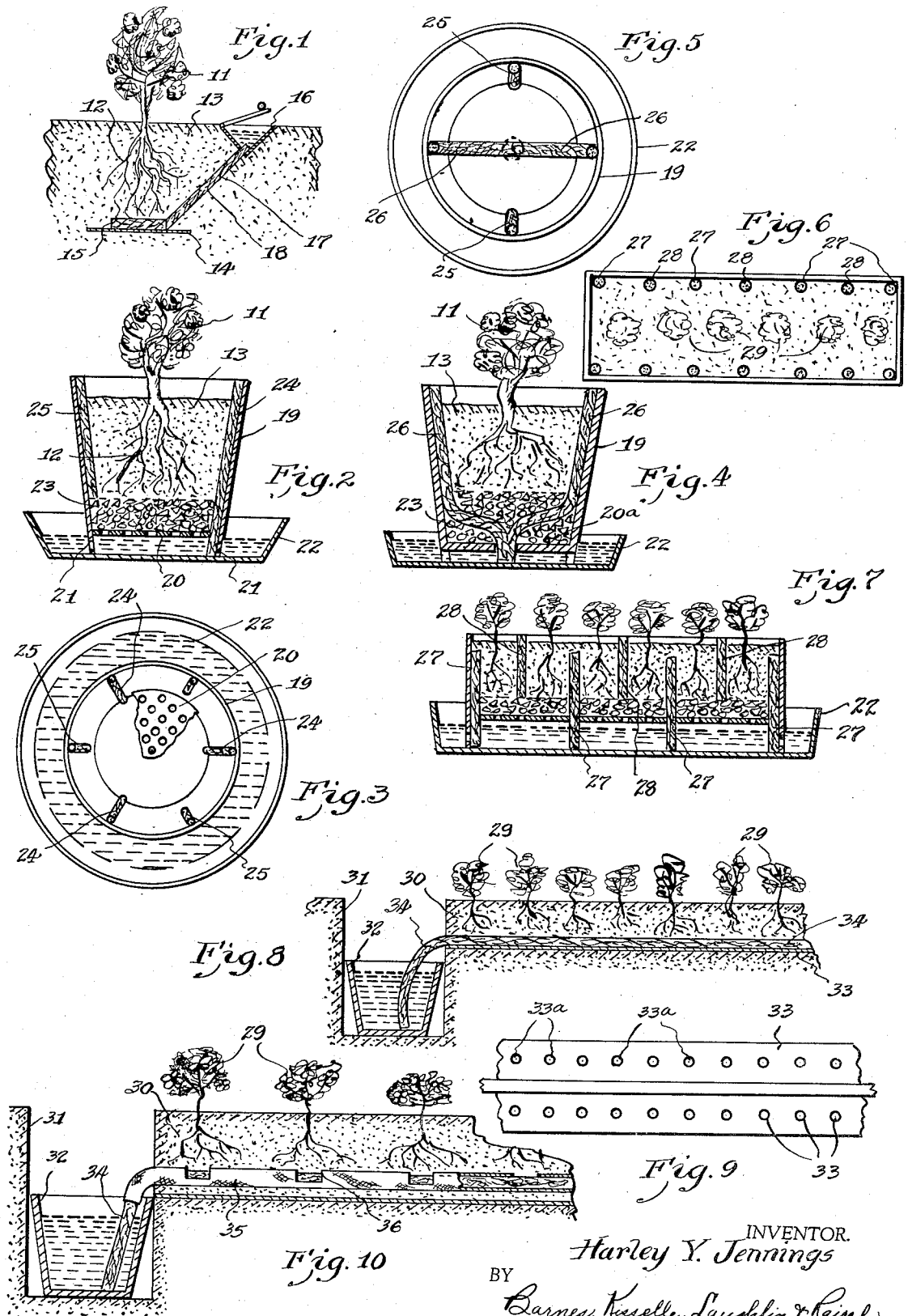

2,346,029

UNITED STATES PATENT OFFICE 2,346,029

PLANT WATERING APPARATUS

Harley Y. Jennings, Flint, Mich., assignor to Copeman Laboratories Company, Flint, Mich., a corporation of Michigan Application December 18, 1937, Serial No. 180,545

2 Claims. (Cl. 47—38)

The present invention relates to a device for supplying water to growing plants.

An object of the invention is to provide an effective means for conducting a constant and measured quantity of water from a suitable source to the plant root area, in an amount sufficient to adequately water the plant without providing an excess of moisture.

A further object is to provide a means for supplying water to the plant root area in such a manner that the roots grow downward rather than upward, as is their tendency when the plants are watered from the upper surface of the soil in the usual manner.

Another object is to provide a means by which soluble plant food of selected types and concentrations can be introduced into the plant root area from an external source, thus utilizing the water and food for the plants to the best advantage.

It has been proposed heretofore to supply water to growing plants by various wick arrangements and constructions using organic substances such as cotton, linen and wool. Such substances have been used successfully to conduct organic liquids, such as kerosene and gasoline, but when they are used to conduct water they have two major defects. One of these is that organic substances have no particular affinity for water, that is, water does not wet them readily. Therefore, such conductive capacity as they may have for water is due almost entirely to a limited degree of capillarity. Another major defect of such substance is that in the presence of water they are readily susceptible to rot and decay and require frequent replacement.

I have found that the inorganic silicate material formed from very fine filaments of spun glass, and known commercially as glass wool, when used as conductor of water, possesses features which overcome the disadvantages of the organic wick materials previously referred to. In the first place the substance, being inorganic, cannot rot or decay. Further, it is insoluble in water, and does not oxidize under the influence of water or exposure to the elements.

More important, however, is the fact that glass wool, as the preferred substance, will be hereafter referred to whether in the form of batting, filaments, threads, yarns, cords, ropes, or fabrics, is decidedly hydrophilic; that is, it has a definite and marked preferential attraction for water. With a substance of this nature, the amount of water it will attract and conduct is dependent on the amount of surface of the substance exposed to the water. Glass wool, being formed of a mass of very individual fibers of material having the composition of ordinary glass, offers a very large surface area per unit of weight and consequently a relatively large water conducting capacity for a relatively small cross-sectional area of the substance.

According to my invention, the glass wool may be used in the form of batting, threads, yarns, ropes, or woven into a fabric. The wool in the form of batting may be enclosed in a wire mesh, or packed under predetermined compression into metallic or fibrous tubes having suitable openings; and the yarn, rope, and fabric may have a selected number of strands of wire associated therewith, as by twisting or weaving, to give strength as well as flexibility.

An important feature of the invention is that the rate and volume of flow of water from the source to the plant root area may be controlled by varying the compactness or density of the glass wool in a given column of space, or in other words, by regulating the amount of exposed glass surface in a given cross-sectional area.

There are many types of irrigating and watering systems which supply water to plants by means of wicks but these have no definite manner of controlling the amount of moisture supplied nor of eliminating excess water so that the plant root soil becomes waterlogged. It is a purpose of the present invention, not only to control to a considerable extent the amount of water added to the soil by establishing a definite relation between the cross-sectional area of the wick used and the amount of soil to be moistened, but to go further and use auxiliary wicks, in some cases, which extend from the surface of the soil down to the root area to absorb and evaporate moisture and assist in aerating the soil. With this wick arrangement, which I have found to be an important feature of the invention, the continuous movement of moisture from the irrigating wicks through the soil to the vent wicks avoids any possibility of a stale or sour soil condition. The auxiliary wick may be a continuation of the feed wick, or may be a separate wick, as hereinafter described. The invention is equally well adapted to use in a garden or in plant containers such as flower pots or boxes, or flats.

The following drawing illustrates various modifications of the invention in which the principles and means of the invention are embodied:

Fig. 1 is a sectional view of one modification of a plant waterer.

Figs. 2 to 5 inclusive, are sectional and plan views respectively of modifications of the invention when used in connection with a flower pot or other plant container.

Figs. 6 and 7 represent a plan view and a longitudinal section respectively of an embodiment of the invention in a flower box.

Fig. 8 illustrates the invention as used in connection with the watering of a row of plants by means of a single rope or strand of glass wool disposed on a waterproof strip.

Fig. 9 is a partial plan view of the apparatus shown in Fig. 8.

Fig. 10 illustrates a modification of the invention in which the glass wool is enclosed in a waterproof casing having spaced openings.

Referring to Fig. 1 a plant 11 having a root area 12 is shown in growing position in the soil 13. Positioned directly below the root area 12 is a waterproof pad 14 upon which rests an absorbent pad 15. A water container 16 having a cover to prevent evaporation is located near the surface of the soil 13 and is provided with an opening in its lower portion through which extends one end of a wick 17 formed of glass wool material previously described. The other end of the wick 17 is in direct contact with the absorbent pad 15. Water will feed slowly down the wick 17 to the moisture pad 15 and will then be fed directly to the roots of the plant 11 by means of the capillary action of the earth 13.

The size of the wick 17 is directly proportioned to the water capacity of the plant 11 since the amount of water which will feed down the wick 17 has a direct relationship to the cross-sectional area of the wick. The wick 17 is preferably encased in a tube 18 which may be made of metal or waterproof paper. If desired the wick 17 may be made by packing the tube 18 with loose glass wool. It is possible, by regulating the density of the packing, to control, to a considerable extent, the rate of the flow of the water to the plant. For example, a half inch pipe may be packed so that it will supply less than a pint of water a day and yet supply that amount gradually and constantly. The pad 15 may be made of glass wool, cellulose sponge, natural sponge, peat humus or any other material capable of holding a large amount of water. The waterproof pad 14 is preferably slightly larger than the absorbent pad 15 in order to prevent a direct downward seepage of the water. This is especially important if the water contains plant food. Due to the nature of the wick 17 it is not necessary that it be connected directly into the bottom of the container 16. Instead it may be carried over the side of the container and it will then serve to syphon the water from the container and feed it down to the waterproof pad.

A second embodiment of the invention is shown in Figs. 2 to 7 inclusive. This embodiment of the invention is especially adapted for use with plants which are grown in receptacles such as flower pots or flower boxes, but its use need not be confined to this type of growing since it may also be used in connection with plants which are growing in the open garden. It is well known in the gardening or plant raising art that drainage is necessary for a potted plant or flower in order to prevent sour or stale soil condition. The present invention proposes to provide an ideal soil condition in a manner which will be described in connection with Figs. 2 to 7.

In carrying out the invention as illustrated in Fig. 2, a container for the soil 13 is shown in vertical section at 19. The container is preferably provided with a perforated bottom 20 and with legs 21 which support the container 19 in a water holding receptacle 22. Course aggregate 23 is preferably placed in the lower portion of the plant container. A wick 24 is disposed vertically along one side of the container and extends through an opening in the bottom 20 into the water container 22. This wick may extend to the top of the container above the soil surface, and is preferably a glass wool rope with its surface directly exposed to the soil in the plant container.

I have found it desirable to provide other wicks 25 which extend along the side of the container in much the same manner as the wicks 24 except that they start at a point above the bottom of the container preferably at the top of the course aggregate 23 and extend above the surface of the soil in the container. These wicks 25, which may be spaced circumferentially around the container as shown in Fig. 3, pick up moisture from the soil and carry it to the surface where it evaporates. It is thus possible to prevent accumulation of excess moisture in the soil and to maintain continuous movement of moisture through the soil. The auxiliary or venting wick 25 also serves to aerate the soil surrounding the roots of the plant. The wicks 24 and 25 may be fastened to the walls of the vessel 19 in some manner which will permit the vessel to be filled with soil but it is not necessary to secure them except for convenience in filling the container, since soil will hold them in place.

Figs. 4 and 5 illustrate the manner in which this modification may be adapted to a flower pot having a single central opening. In this case a set of feeding wicks 26 may extend through the central opening in the bottom 20a of the container 19 and diverge to the sides of the container. Similarly the auxiliary wicks 25 can be disposed above the course aggregate as described with reference to Fig. 2. This modification may also be adapted to a flower box as shown in Figs. 6 and 7 where feeding wicks 27 and auxiliary or venting wicks 28 are alternately spaced along the sides of the box.

A third embodiment of the basic invention is shown in Figs. 8, 9 and 10, where a single wick is used for feeding a row of plants 29 in the soil 30 in which is provided a hole or pit 31 for receiving a water vessel 32. Directly beneath the row of plants 29 is a waterproof strip 33 which is placed at a proper distance below the soil surface so that the plant roots will have adequate room to develop. This waterproof strip 33 is preferably provided with spaced holes 33a, the purpose of which will later be described. A wick 34 is longitudinally disposed along the center portion of the waterproof strip 33 and has one end dipping into the water in the vessel 32. The wick 34 is attached to the strip 33 to permit convenient handling of the combination.

The waterproof strip 33 may be formed of asphalt, paraffin or latex paper and serves two purposes. It acts as a support for the wicking material and also prevents the moisture from the wicking 34 from being dissipated directly downward through the sub-soil. This arrangement greatly reduces the amount of water which must be furnished to give effective results and of course, serves the additional function of localizing plant food in case this is added to the water. The perforations or spaced holes 33a are provided in the margins of the strip 33 to allow an excess supply of water, as from a heavy rain, to pass through to the sub-soil. These perforations are preferably small enough to permit drainage but not to allow direct soil contact since this would tend to carry the moisture from the wicks downward and thus defeat the primary purpose of the strip. A modification of the arrangement shown in Figs. 8 and 9 is shown in Fig. 10 where the wicking 34 is covered with a tube 35 which has openings in the top portion spaced to correspond to the spacing of the plants in the row which is to be watered. This type of construction is particularly desirable for large plants or shrubs which are placed some distance apart. It is necessary then to supply moisture only directly underneath the plant.

I claim:

1. An apparatus for furnishing moisture and food to a growing plant comprising a soil container for a plant having one or more openings in the bottom portion thereof, a water container for receiving the lower portion of said plant container, a body of glass wool extending from said water container through said openings in said plant container to the soil receiving portion thereof, and a body of glass wool extending from the inside lower portion of said soil container to the soil level.

2. An apparatus for furnishing water to growing plants, comprising a water source, a series of spun glass bodies extending from the water source through the root soil of the plants, and a second series of spun glass bodies extending from the atmosphere to the root soil of the plants whereby moisture is conveyed to the root soil from said first series of spun glass bodies and conveyed away from the root soil by said second series of spun glass bodies.

HARLEY Y. JENNINGS.